US011208068B2

(12) United States Patent
Kim

(10) Patent No.: US 11,208,068 B2
(45) Date of Patent: Dec. 28, 2021

(54) CURVED SIDE AIRBAG

(71) Applicant: ZF Passive Safety Systems US Inc., Washington, MI (US)

(72) Inventor: Young S. Kim, Rochester Hills, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 151 days.

(21) Appl. No.: 16/594,449

(22) Filed: Oct. 7, 2019

(65) Prior Publication Data

US 2021/0101552 A1 Apr. 8, 2021

(51) Int. Cl.
*B60R 21/207* (2006.01)
*B60R 21/231* (2011.01)
*B60R 21/2338* (2011.01)
*B60R 21/013* (2006.01)
*B60R 21/264* (2006.01)

(52) U.S. Cl.
CPC .......... *B60R 21/207* (2013.01); *B60R 21/013* (2013.01); *B60R 21/2338* (2013.01); *B60R 21/23138* (2013.01); *B60R 21/264* (2013.01); *B60R 2021/23107* (2013.01); *B60R 2021/23146* (2013.01); *B60R 2021/23386* (2013.01)

(58) Field of Classification Search
CPC ........... B60R 21/207; B60R 21/23138; B60R 21/2338; B60R 21/013; B60R 21/264; B60R 2021/23386; B60R 2021/23107; B60R 2021/23146
See application file for complete search history.

(56) References Cited

U.S. PATENT DOCUMENTS

| | | | | |
|---|---|---|---|---|
| 5,730,464 | A | * | 3/1998 | Hill .................... B60R 21/23138 280/730.2 |
| 9,016,718 | B2 | * | 4/2015 | Fukawatase ...... B60R 21/23138 280/730.2 |
| 10,246,041 | B2 | * | 4/2019 | Kobayashi ............ B60R 21/237 |
| 2012/0235388 | A1 | * | 9/2012 | Suzuki .................. B60R 21/233 280/730.2 |
| 2015/0217714 | A1 | * | 8/2015 | Fujiwara ............... B60R 21/235 280/729 |
| 2019/0161048 | A1 | * | 5/2019 | Thomas ................. B60R 21/215 |
| 2019/0161050 | A1 | * | 5/2019 | Schneider ........... B60R 21/2338 |
| 2019/0184929 | A1 | * | 6/2019 | Ward .................... B60R 21/233 |

* cited by examiner

*Primary Examiner* — Darlene P Condra

(74) *Attorney, Agent, or Firm* — Tarolli, Sundheim, Covell & Tummnio LLP

(57) ABSTRACT

A side airbag inflatable between an occupant of a vehicle seat and structure of the vehicle adjacent the vehicle seat. The side airbag includes a first airbag panel for being positioned facing away from the vehicle seat and a second airbag panel for being positioned facing the vehicle seat. The first and second panels define an inflatable volume of the side airbag. A tether assembly includes a first anchor panel attached to a first portion of the first airbag panel, a second anchor panel attached to a second portion of the first airbag panel, and a strap that interconnects the first anchor panel and the second anchor panel. The tether assembly is dimensioned and configured to limit movement of the first and second portions away from each other in response to inflation of the side airbag so that the side airbag assumes a curved shape when inflated.

18 Claims, 9 Drawing Sheets

CURVED SIDE AIRBAG

TECHNICAL FIELD

The present invention relates a vehicle safety system that takes into account some of the unique conditions found in autonomous vehicles.

BACKGROUND

It is known to provide an inflatable vehicle occupant protection device, such as an airbag, for helping to protect an occupant of a vehicle. One particular type of airbag is a side airbag inflatable adjacent an occupant of a vehicle seat, typically between the occupant and a side structure of the vehicle. Side airbags are inflatable to help protect the occupant in response to the occurrence of a crash event that results in lateral movement of the occupant or movement of the occupant that has a lateral component. Examples of these crash events include side impact crash events, offset frontal crash events, and oblique frontal/side crash events. When inflated, side airbags help protect the occupant from impacts with parts of the vehicle such as the side structure of the vehicle.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure typically included in a vehicle, such as a steering wheel and other operator controls.

With these realities as a backdrop, the paradigm of occupant safety systems must shift. In the past, the necessity of a vehicle operator/driver lent to a somewhat standard vehicle passenger cabin configuration. For example, in the U.S., the driver is a front vehicle seat, left side, forward facing occupant within reach of the vehicle controls and instrumentation (steering wheel, pedals, instrument panel, console, etc.). This driver configuration helps dictate the layout of the remainder of the vehicle so that first, second, third row, etc. passengers are also forward facing. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, with regard to side airbags, structures such as the vehicle side structure or center console can be utilized as reaction surfaces against which the side airbag rests so that it can oppose, cushion, and absorb the impact energy of an impacting occupant and provide a desired ride-down effect. In the autonomous vehicles, however, the vehicle may not have a center console, and the occupants could be positioned away from the side structure or oriented in a manner that differs from tradition. This can make it difficult or impossible to utilize traditional structures in the vehicle as reaction surface.

SUMMARY

According to one aspect of the invention, a vehicle safety system includes a side airbag that is inflatable adjacent an occupant of a vehicle seat. The side airbag includes a tether assembly that restricts deployment of certain portions of the side airbag so that the airbag assumes a curved shape when fully inflated and deployed. In an inboard mounting location, the side airbag can help protect occupants moving inboard in response to crash events, such as side impacts, offset frontal impacts, or oblique side/frontal impacts, where the occupant moves inboard in response to the impact. The curvature of the side airbag can be configured to extend opposite this inboard movement and therefore can improve the response time of the safety system and the level of protection afforded to the occupant.

According to another aspect, a side airbag is inflatable between an occupant of a vehicle seat and structure of a vehicle adjacent the vehicle seat. The airbag includes a first airbag panel for being positioned facing away from the vehicle seat, and a second airbag panel for being positioned facing the vehicle seat, the first and second panels defining an inflatable volume of the side airbag. The airbag also includes a tether assembly including a first anchor panel attached to a first portion of the first airbag panel, a second anchor panel attached to a second portion of the first airbag panel, and a strap that interconnects the first anchor panel and the second anchor panel. The tether assembly is dimensioned and configured to limit movement of the first and second portions away from each other in response to inflation of the side airbag so that the side airbag assumes a curved shape when inflated.

According to another aspect, alone or in combination with any other aspects, the tether assembly can be configured so that the second airbag panel faces convexly toward the vehicle seat when the side airbag is inflated.

According to another aspect, alone or in combination with any other aspects, the side airbag can be configured to be deployed on an inboard side of the vehicle seat. The second airbag panel can face convexly outboard of the vehicle toward the vehicle seat when the side airbag is inflated.

According to another aspect, alone or in combination with any other aspects, the first anchor panel can have a peripheral portion configured to match a peripheral portion of the first portion of the first airbag panel. The first anchor panel can be positioned on the first portion of the first airbag panel so that their peripheral portions overlie each other. The first anchor panel can be interconnected with the first portion of the first airbag panel along their overlying peripheral portions. Additionally, the second anchor panel can have a peripheral portion configured to match a peripheral portion of the second portion of the first airbag panel. The second anchor panel can be positioned on the second portion of the first airbag panel so that their peripheral portions overlie each other. The second anchor panel can be interconnected with the second portion of the first airbag panel along their overlying peripheral portions. Further, the strap can be connected to respective edge portions of the first and second anchor panels. The edge portions of the first and second anchor panels can be spaced from the peripheral portions of the first and second anchor panels and free from direct interconnections to the airbag.

According to another aspect, alone or in combination with any other aspects, the peripheral portion of the first anchor panel can span substantially the entire width of the first portion of the first airbag panel so that tension applied to the first anchor panel by the strap is distributed substantially across the entire width of the first portion of the first airbag panel.

According to another aspect, alone or in combination with any other aspects, the strap can have a width that is substantially smaller than the widths of the first and second anchor panels.

According to another aspect, alone or in combination with any other aspects, the first portion of the first airbag panel can be positioned at an upper extent of the side airbag and the second portion of the first airbag panel can be positioned at a lower extent of the side airbag.

According to another aspect, alone or in combination with any other aspects, the airbag can be curved along the height of the side airbag from the first portion to the second portion.

According to another aspect, alone or in combination with any other aspects, the first portion of the first airbag panel can be positioned at an upper extent of the side airbag and the second portion of the first airbag panel can be positioned on or adjacent a rear extension portion of the side airbag positioned between the upper and lower extents of the side airbag. The extension portion can be configured to connect the side airbag to the vehicle seat and to direct inflation fluid into the side airbag. The side airbag can be curved from the first portion to the extension portion.

According to another aspect, alone or in combination with any other aspects, the airbag can be curved along a diagonal extending from the first portion downward and rearward to the extension portion.

According to another aspect, alone or in combination with any other aspects, the first portion of the first airbag panel can be positioned at a lower extent of the side airbag and the second portion of the first airbag panel can be positioned on or adjacent a rear extension portion of the side airbag positioned between the upper and lower extents of the side airbag. The extension portion can be configured to connect the side airbag to the vehicle seat and to direct inflation fluid into the side airbag. The side airbag can be curved from the first portion to the extension portion.

According to another aspect, alone or in combination with any other aspects, the airbag can be curved along a diagonal extending from the first portion upward and rearward to the extension portion.

According to another aspect, alone or in combination with any other aspects, the first portion of the first airbag panel can be positioned at a forward extent of the side airbag and the second portion of the first airbag panel can be positioned on or adjacent on or adjacent a rear extension portion of the side airbag positioned between the upper and lower extents of the side airbag. The extension portion can be configured to connect the side airbag to the vehicle seat and to direct inflation fluid into the side airbag. The side airbag can be curved from the first portion to the extension portion.

According to another aspect, alone or in combination with any other aspects, the airbag can be curved along a horizontal extending from the first portion rearward to the extension portion.

According to another aspect, alone or in combination with any other aspects, the overlying first and second airbag panels can define a main body of the airbag, the main body portion having an upper portion, a lower portion, and an extension portion positioned between the upper and lower portions and extending rearward from the main body. The extension portion can be configured to receive inflation fluid from an inflator for inflating the side airbag and/or to attach the side airbag to the vehicle seat.

According to another aspect, alone or in combination with any other aspects, the extension portion can be configured to attach the side airbag to a seat frame in a seatback of the vehicle seat.

According to another aspect, alone or in combination with any other aspects, an airbag module can include the side airbag, an inflator actuatable to inflate the side airbag, and a packaging for helping to support the side airbag in a deflated and stowed condition. A vehicle safety system can include the airbag module and a controller that is configured to actuate the inflator in response to a sensed crash event to cause the side airbag to inflate and deploy.

BRIEF DESCRIPTION OF THE DRAWINGS

Example configurations of the invention will now be described by way of example only, with reference to the accompanying drawings, in which.

DETAILED DESCRIPTION

Figure 1:
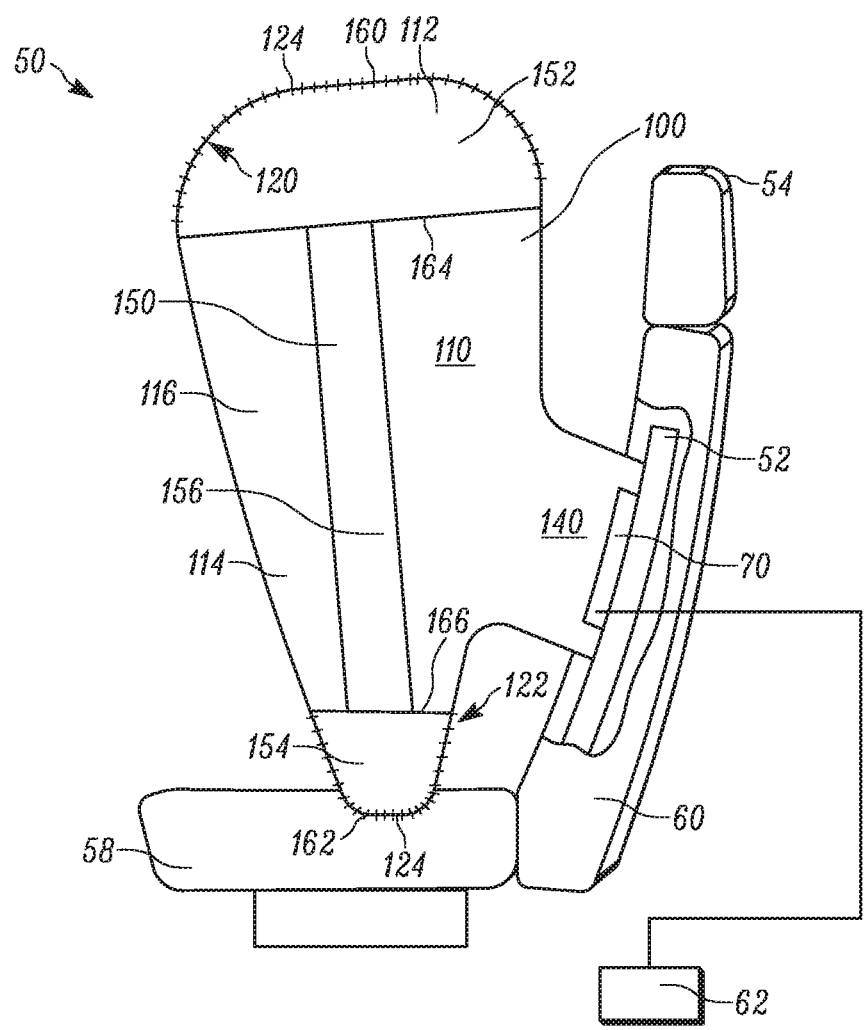
FIG. 1 is a side view illustrating a vehicle safety system according to an example configuration of the invention.
Figure 2:
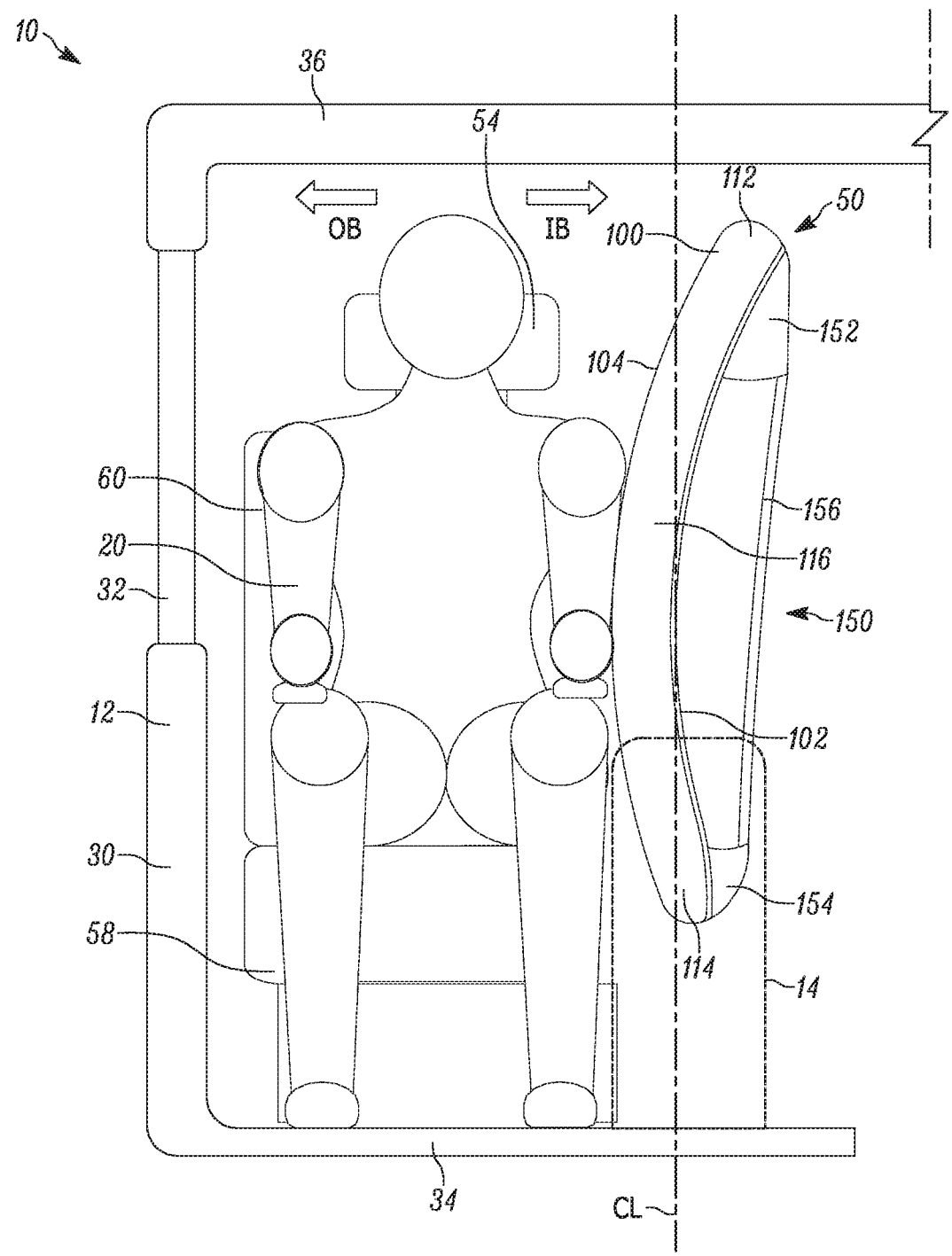
FIG. 2 is a front view of the vehicle safety system of FIG. 1.
Figure 3:
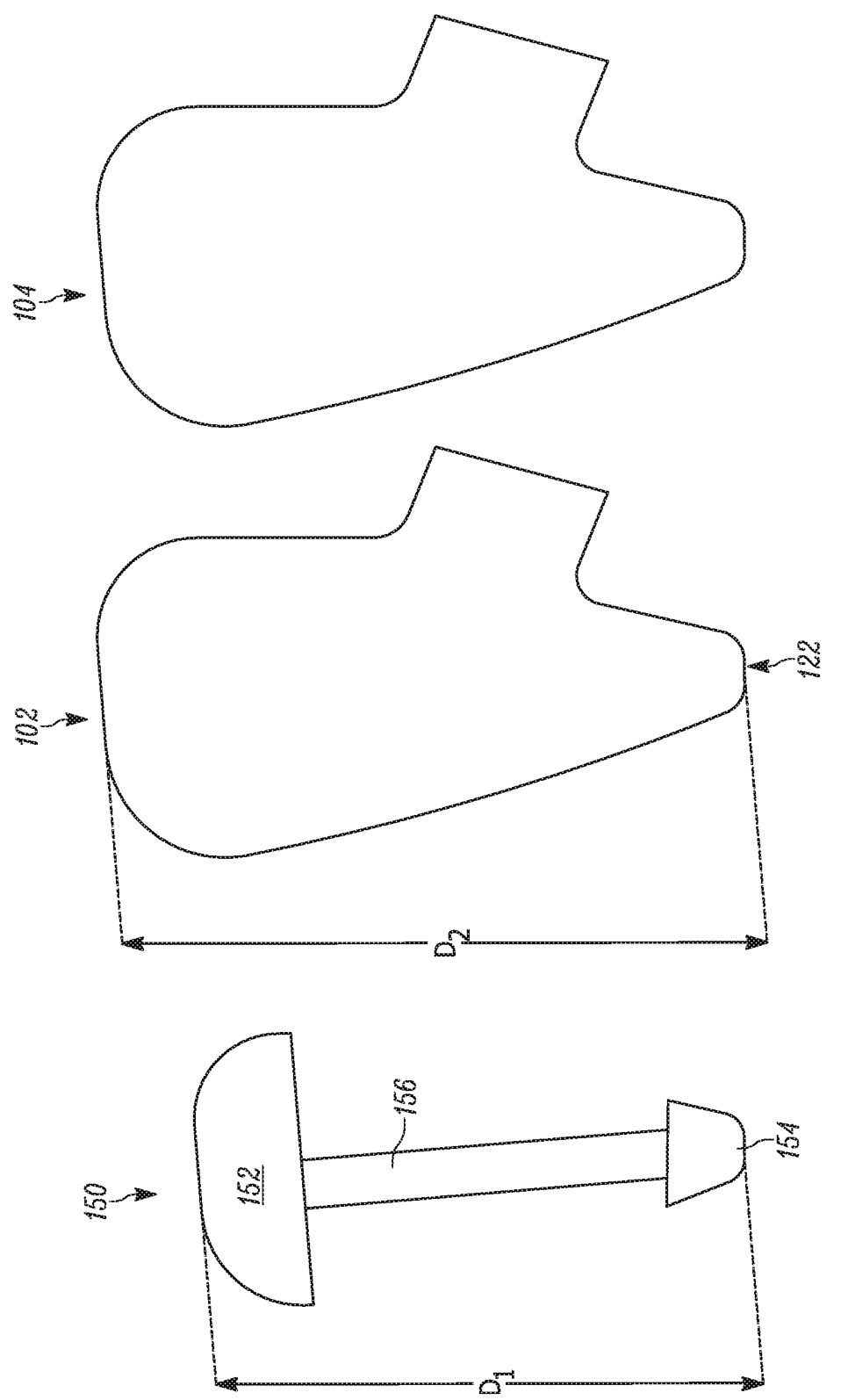
FIG. 3 is an exploded view of a portion of the vehicle safety system of FIG. 1.

A vehicle safety system 50 helps to protect an occupant 20 of a vehicle seat 54 in a vehicle 10. A first example configuration of the vehicle safety system 50 is shown in FIGS. 1-3. In this description, reference is made to inboard and outboard sides of the vehicle 10 and portions of the vehicle, such as the vehicle seat 54. Inboard and outboard are identified generally at IB and OB respectively, in FIG. 2. Outboard (OB) refers to the area of or direction toward the side structure 12 of the vehicle 10. Inboard (IB) refers to the area of or direction toward the longitudinal centerline (CL) of the vehicle 10.

FIG. 2 illustrates a vehicle seat 54 on a passenger side of a left-hand drive vehicle. In FIG. 2, an outboard side of the vehicle seat 54 is positioned adjacent the side structure 12, and an inboard side of the vehicle seat is positioned adjacent the centerline CL of the vehicle. The side structure 12 can include a vehicle side door 30 and side window 32. The side structure 12 extends from the vehicle floor 34 to the vehicle roof 36.

In some vehicles, a center console 14 is located adjacent the inboard side of the vehicle seat 54. In other vehicles, such as an autonomous vehicle, there may be no center console or other structure adjacent the inboard side of the vehicle seat 54. The center console 14 is therefore illustrated in dashed lines in FIG. 1, to show that it may not be present in certain vehicles. The vehicle seat 54 includes a seat bottom 58 and a seat back 60, each of which include a portion of the vehicle seat frame 52.

The vehicle safety system 50 includes a side airbag 100 connected to a frame 52 of the vehicle seat 54. The side airbag 100 can be attached to the portion of the frame 52 that is disposed in the seat back 60 and/or to the portion of the frame that is disposed in the seat bottom 58. In the example configuration illustrated in FIG. 2, the side airbag 100 is connected to the inboard side of the vehicle seat 54.

The vehicle safety system 50 also includes an inflator 70 configured to provide inflation fluid for inflating the side airbag 100. The inflator 70 can, for example, contain a stored quantity of pressurized inflation fluid and an ignitable material for heating the inflation fluid. Alternative inflator arrangements, however, can be used. For example, the inflator 70 can contain gas-generating material that is combustible to generate inflation fluid. As another example, the inflator 70 can contain only a stored quantity of pressurized inflation fluid. The inflator 70 is actuatable by a controller 62 that is operatively connected to one or more sensors. The controller 62 is adapted to actuate the inflator 70 in response to the determining, in response to data provided by the sensors, the occurrence of an event for which occupant protection is desired, such as a vehicle impact or rollover event.

As shown in FIG. 2, the vehicle safety system 50 is configured for inboard occupant protection, so the side airbag 100 is inflatable on the inboard side of the vehicle seat. The side airbag 100 includes a first airbag panel 102 and a second airbag panel 104 that help define an inflatable volume of the side airbag 100. When the side airbag 100 is inflated, the first airbag panel 102 is positioned facing away from the vehicle seat 54 and the occupant 20, of the second airbag panel 104 is positioned facing toward the vehicle seat 54 and the occupant 20. In this description, when the panels 102, 104 are described as "facing" in a certain direction, it is meant to refer to the direction which surfaces of the panels on the exterior of the side airbag 100 face.

The first and second airbag panels 102, 104 can be manufactured from any material suited to construct a side airbag, such as a woven nylon fabric. The first and second airbag panels 102, 104 can be separately manufactured and subsequently attached to one another to form the side airbag 100. Alternatively, the panels 102, 104 can be portions of a single folded panel. As another alternative, the side airbag 100 can be of a one-piece woven airbag construction.

The side airbag 100 of FIGS. 1-3 includes a main body portion 110 and an extension portion 140. The side airbag 100 includes an upper portion 112 for being positioned adjacent the normally seated occupant's head, shoulders/upper torso when inflated. The side airbag 100 also includes a lower portion 114 for being positioned adjacent the normally seated occupant's hips/lower torso when inflated. The side airbag 100 also includes a mid-portion 116, between the upper and lower portions 112, 114, for being positioned adjacent the normally seated occupant's torso when inflated. The extension portion 140 extends rearward from the mid-portion 116 toward the seat back 60. The extension portion 140 is configured to receive the inflator 70 and also to facilitate connecting the side airbag 100 to the vehicle seat frame 52. The side airbag 100 has a height measured vertically as viewed in FIG. 1 and a width measured horizontally as viewed in FIG. 1. The height and width of all the side airbags disclosed herein is measured in this manner.

The side airbag 100 includes a tether assembly 150 for shaping the side airbag when deployed. In the example configuration of FIGS. 1-3, the tether assembly 150 is connected to the upper and lower portions 112, 114 of the side airbag 100 to shape the airbag to curve, from top to bottom, convexly toward the occupant (see, FIG. 2). In this curved condition of the side airbag 100, the second airbag panel 104 faces convexly toward the seated occupant 20 and the vehicle side structure 12. The tether assembly 150 is positioned on an exterior surface of the airbag, i.e., on an exterior surface of the first airbag panel 102. The tether assembly 150 faces away from the vehicle seat 54 and the seated occupant 20 (inboard in FIG. 2) when the side airbag 100 is inflated.

The tether assembly 150 includes a first, upper anchor panel 152, a second, lower anchor panel 154, and a strap 156 that interconnects the upper and lower anchor panels. The strap 156 has a width that can be substantially smaller (e.g., as little as 20% or less) than the widths of the upper and lower anchor panels 152, 154. The tether assembly 150 can be constructed of any suitable material, such as airbag fabric. The tether assembly 150 can be a single piece of material that is cut to the shape shown in FIG. 1, or it can be three separate pieces of material, as shown in FIG. 3, that are interconnected by known means, such as stitching or ultrasonic welding.

The upper anchor panel 152 is attached to an upper portion 120 of the first airbag panel 102. As shown in FIGS. 1 and 3, the upper anchor panel 152 can be configured and shaped to correspond to the upper portion 120 of the first airbag panel 102. The lower anchor panel 154 is attached to a lower portion 122 of the first airbag panel 102. As shown in FIGS. 1 and 3, the lower anchor panel 154 can be configured and shaped to correspond to the lower portion 122 of the first airbag panel 102. The upper and lower anchor panels 152, 154 can be secured to the first airbag panel 102 by connections 124, such as stitching or ultrasonic welding. As shown in FIG. 1, the connections 124 extends about and interconnects respective peripheries 160, 162 of the upper and lower anchor panels 152, 154 that coincide with and overlie peripheries of the upper and lower portions 112, 114 of the side airbag 100, respectively. Edge portions 164, 166 of the upper and lower anchor panels 152, 154, respectively, are left free from connection to the side airbag 100. The strap 156 is connected to these edge portions 164, 166, by stitching, ultrasonic welding, or as a result of the tether assembly 150 being constructed of a single piece of material.

The controller 62 actuates the inflator 70 in response to detecting an event, such as a side impact or rollover, having a magnitude that exceeds a predetermined threshold. When the inflator 70 is actuated, inflation fluid flows through the extension portion 140, which acts a mouth or conduit for directing inflation fluid into the main body portion 110 to inflate the side airbag 100. The side airbag 100 inflates out of the vehicle seat 54 to the inflated condition shown in FIGS. 1 and 2.

As shown in FIG. 2, the tether assembly 150 restricts movement of the upper and lower portions 112, 114 of the side airbag 100 so that the airbag takes on the illustrated curved configuration. In the example configuration of FIGS. 1-3, the side airbag 100 is curved, from top to bottom, convexly toward the occupant. More specifically, the exterior surface of the second airbag panel 104 is curved convexly toward the occupant, and the exterior surface of the first airbag panel 102 is curved concavely toward the vehicle centerline CL. The degree or extent of the curvature illustrated in the figures is by way of example only. The curvature can be tailored according to requirements dictated by, for example, available space and vehicle architecture.

The curved shape of the inflated side airbag 100 is due to the fact that a distance D1 (see FIG. 3) representing the length of the tether assembly 150 measured between terminal ends of the tether assembly is less than a distance D2 representing the length (i.e., height) of the side airbag 100 as measured between the upper and lower extents of the airbag. As a result of this length differential, the tether assembly 150 restricts the side airbag 100 from deploying to the fully expanded state to which it would otherwise expand if unrestricted. In the example configuration shown in FIGS. 1-3, the side airbag 150 would, if not restricted by the tether assembly 150, expand to a generally linear shape instead of the illustrated curved shape, as indicated generally by dashed lines at 100' in FIG. 2.

The direction of curvature of the side airbag 100 is due to the tether assembly 150 being secured to the outer surface of the first airbag panel 102. This connection, in combination with the configurations and dimensions of the tether assembly 150, helps ensure that the resulting restriction of the upper and lower airbag portions 112, 114 and of curvature of the side airbag 100 in the desired manner. In the example configuration of FIGS. 1-3, this curvature is convexly toward the occupant, given the inboard mounting location of the side airbag 100.

Implementing the first and second anchor panels 152, 154 of the tether assembly 150 provides several benefits. The anchor panels 152, 154 are shaped to coincide with the shapes of the upper and lower portions 112, 114, respectively, of the side airbag 100. The connections 124, which connects the peripheral portions 160, 162 of the anchor panels 152, 154, extends the connections of the anchor panels to the airbag across the width (as viewed in FIG. 1) of the side airbag 100. Leaving the edges 164, 166 of the anchor panels 152, 154 disconnected from the side airbag 100 therefore causes the tension forces applied to the airbag by the tether assembly 150 to be applied along the peripheries 160, 162.

The application of the tension forces along the peripheries 160, 162 helps distribute forces generated by the tensioning of the tether assembly 150 during inflation of the side airbag 100 over a larger area of the airbag than would be the case if the strap 156 alone were used. Distributing these forces helps reduce the stress between any particular point of connection with the airbag and also helps prevent the occurrence of stress risers where material failures can occur. The connection of the tether assembly 150 to the side airbag 100 is therefore robust.

Distributing the restriction forces that the tether assembly 150 exerts on the side airbag 100 along the peripheries 160, 162 also helps ensure that the entire side airbag assumes the desired curved configuration or shape. If the strap 156 were to have a narrow connection (i.e., the width of the strap) with the upper and lower portions 112, 114 of the side airbag 100, instead of assuming a generally uniform curved configuration as shown in FIG. 2, the airbag could instead become bunched or caved-in in the areas of these narrow connections. This is because the tension applied by the strap 156 would be focused on the central areas of the upper and lower portions where the connection is made. The strap 156 would act on these areas as desired, but the areas adjacent the strap connection would be urged by inflation fluid pressure to move toward the unrestricted condition of the side airbag 100. Utilizing the anchor panels 152, 154 to make the connection distributes the tension forces applied by the strap 156 across the entire upper and lower portions 112, 114 of the side airbag 100, which helps prevent or eliminate any caving-in or bunching.

Advantageously, the curved configuration of the side airbag 100 enforced by the tether assembly 150 helps improve the occupant protection performance of the vehicle safety system 50. During deployment, as the side airbag 100 moves toward the inflated condition, the curvature in the airbag develops. Due to the location of the side airbag 100 and the direction of its curvature, the movement of the deploying airbag is not only upward and forward (with respect to the direction of forward vehicle travel) from the stowed condition in the vehicle seat 54, but also outboard toward the occupant 20. This airbag motion can act to increase the responsiveness of the safety system 50 by reducing the time it takes for the side airbag 100 to initially engage the occupant 20.

In the example configuration of FIG. 2, the airbag is mounted on the inboard side of the vehicle seat 54 and therefore offers occupant protection in the area of the vehicle centerline CL. Being intended primarily for helping to protect the occupant 20 in response to events such as a side impact, offset frontal impact, or oblique frontal/side impact, and being inboard or center mounted, the side airbag 100 can help protect the occupant in collisions that occur on the opposite side of the vehicle 10 (i.e., the driver side in the example configuration of FIG. 2). In those instances, the outboard movement of the deploying airbag 100 can help decelerate or reverse the inboard movement of the occupant 20, which can help protect against occupant-on-occupant impacts. To this end, the side airbag 100 can also act as a barrier between occupants seated adjacent each other.

Additionally, the curved configuration of the side airbag 100 can help overcome the lack or reduced size of a reaction surface for the airbag. The curvature of the side airbag 100 in combination with the pressurization of the airbag, can offer resistance to inboard occupant movement. This can, for example, be due to the fact that the side airbag 100, when assuming the curved configuration, deploys/moves toward the occupant, who is being urged to move inboard due to the crash forces. The airbag movement counteracts the occupant movement, which helps improve the level of protection afforded to the occupant.

Figure 4:
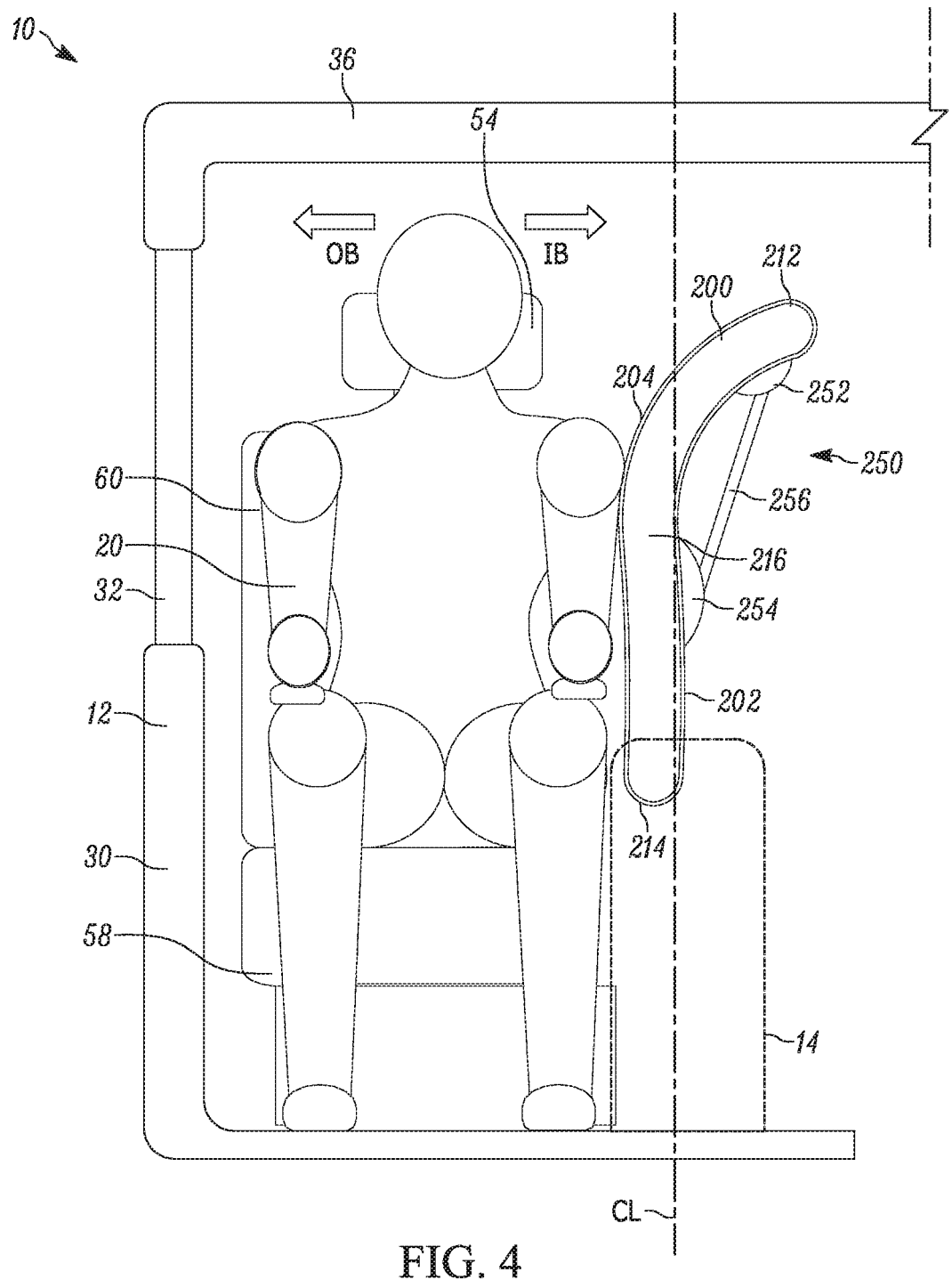
FIG. 4 is a front view of a vehicle safety system according to a second example configuration of the invention.
Figure 5:
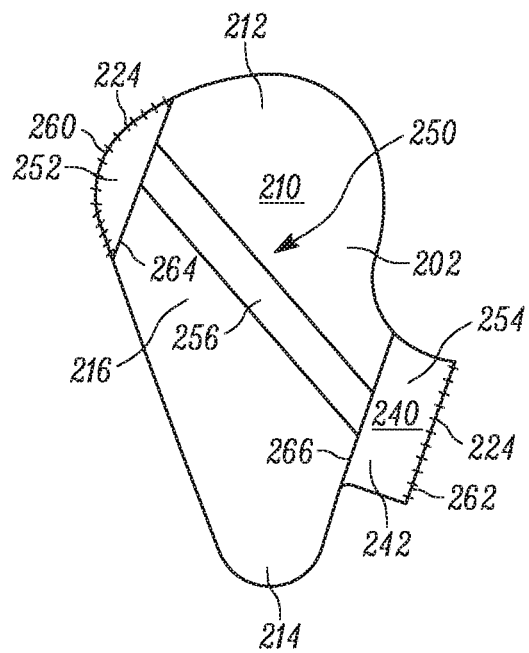
FIG. 5 is a side view of a portion of the vehicle safety system of FIG. 4.
Figure 6:
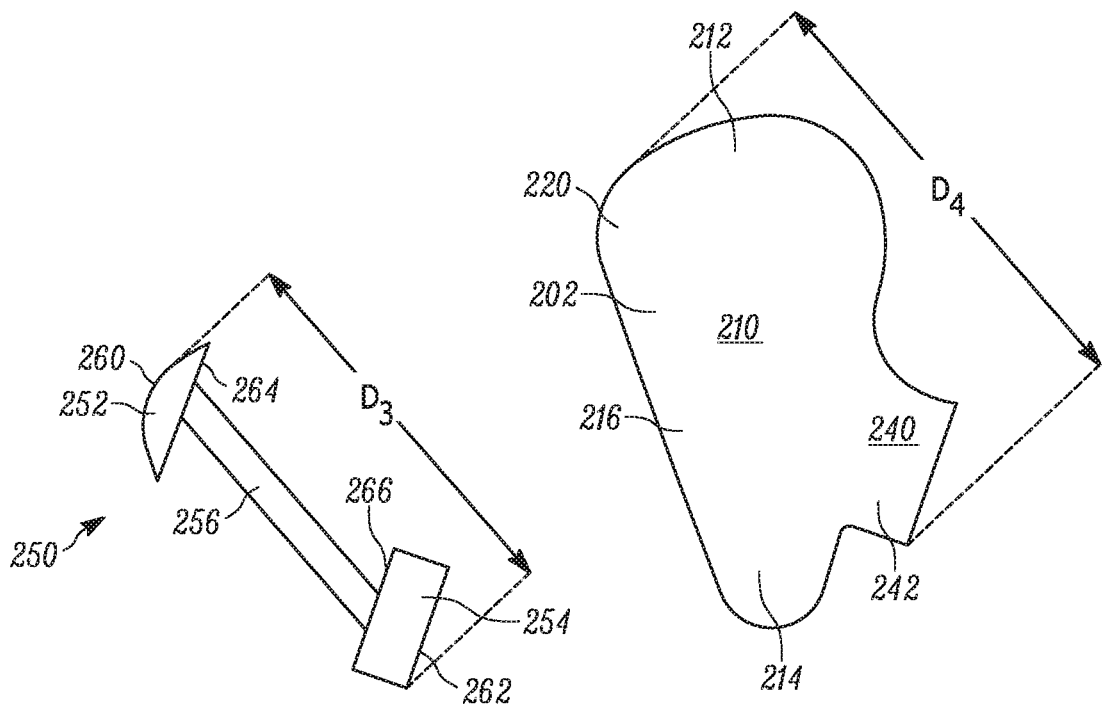
FIG. 6 is an exploded view of the portion of FIG. 5.

A second example configuration of the vehicle safety system 50 is illustrated in FIGS. 4-6. The vehicle safety system 50 of FIGS. 4-6 is similar or identical to the configuration of FIGS. 1-3, except that the configuration of the side airbag, specifically the tether assembly, is different.

As shown in FIG. 4, the vehicle safety system 50 is configured for inboard occupant protection, so the side airbag 200 is inflatable on the inboard side of the vehicle seat. The side airbag 200 includes a first airbag panel 202 and a second airbag panel 204 that help define an inflatable volume of the side airbag 200. When the side airbag 200 is inflated, the first airbag panel 202 is positioned facing away from the vehicle seat 54 and the occupant 20, of the second airbag panel 204 is positioned facing toward the vehicle seat 54 and the occupant 20. In this description, when the panels 202, 204 are described as "facing" in a certain direction, it is meant to refer to the direction which surfaces of the panels on the exterior of the side airbag 200 face.

The first and second airbag panels 202, 204 can be manufactured from any material suited to construct a side airbag, such as a woven nylon fabric. The first and second airbag panels 202, 204 can be separately manufactured and subsequently attached to one another to form the side airbag 200. Alternatively, the panels 202, 204 can be portions of a single folded panel. As another alternative, the side airbag 200 can be of a one-piece woven airbag construction.

The side airbag 200 of FIGS. 4-6 includes a main body portion 210 and an extension portion 240. The side airbag 200 includes an upper portion 212 for being positioned adjacent the normally seated occupant's head, shoulders/upper torso when inflated. The side airbag 200 also includes a lower portion 214 for being positioned adjacent the normally seated occupant's hips/lower torso when inflated. The side airbag 200 also includes a mid-portion 216, between the upper and lower portions 212, 214, for being positioned adjacent the normally seated occupant's torso when inflated. The extension portion 240 extends rearward from the mid-portion 216 toward the seat back 60. The extension portion 240 is configured to receive the inflator and also to facilitate connecting the side airbag 200 to the vehicle seat frame.

The side airbag 200 includes a tether assembly 250 for shaping the side airbag when deployed. In the example configuration of FIGS. 4-6, the tether assembly 250 is connected to the upper portion 212 and the extension portion 240 of the side airbag 200 to shape the airbag to curve toward the occupant 20, from the upper portion 212 to the extension portion 240. Since the extension portion 240 lies in the mid-portion 216 of the side airbag 200, the airbag curves toward the occupant 20 from the upper portion 212 to the mid-portion 216. This is shown in FIG. 4. As shown, the side airbag 200 curve is convexly outboard toward the occupant 20 and the side structure 12, away from the vehicle centerline CL. In this curved condition of the side airbag 200, the second airbag panel 204 faces convexly toward the occupant 20 and the side structure 12.

The tether assembly 250 includes a first, upper anchor panel 252, a second, lower anchor panel 254, and a strap 256 that interconnects the upper and lower anchor panels. The strap 256 has a width that can be substantially smaller (e.g., as little as 20% or less) than the widths of the upper and lower anchor panels 252, 254. The tether assembly 250 can be constructed of any suitable material, such as airbag fabric. The tether assembly 250 can be a single piece of material that is cut to the shape of its three components, or it can be three separate pieces of material that are interconnected by known means, such as stitching or ultrasonic welding. The tether assembly 250 is positioned on an exterior surface of the airbag, i.e., on an exterior surface of the first airbag panel 202. The tether assembly 250 faces away from the vehicle seat and the seated occupant 20 (inboard in FIG. 4) when the side airbag 200 is inflated.

The upper anchor panel 252 is attached to an upper portion 220 of the first airbag panel 202. As shown in FIGS. 5 and 6, the upper anchor panel 252 can be configured and shaped to correspond to the upper portion 220 of the first airbag panel 202. The lower anchor panel 254 is attached to the extension portion 242 of the first airbag panel 202. As shown in FIGS. 5 and 6, the lower anchor panel 254 can be configured and shaped to correspond to the extension portion 242 of the first airbag panel 202. The upper and lower anchor panels 252, 254 can be secured to the first airbag panel 202 by connections 224, such as stitching or ultrasonic welding. As shown in FIG. 5, the connections 224 extends about and interconnects respective peripheries 260, 262 of the upper and lower anchor panels 252, 254 that coincide with and overlie peripheries of the upper portion 212 and extension portion 240 of the side airbag 200, respectively. Edge portions 264, 266 of the upper and lower anchor panels 252, 254, respectively, are left free from connection to the side airbag 200. The strap 256 is connected to these edge portions 264, 266, by stitching, ultrasonic welding, or as a result of the tether assembly 250 being constructed of a single piece of material.

When the controller actuates the inflator, inflation fluid flows through the extension portion 240, which acts a mouth or conduit for directing inflation fluid into the main body portion 210 to inflate the side airbag 200. The side airbag 200 inflates out of the vehicle seat 54 to the inflated condition shown in FIG. 4.

As shown in FIG. 4, the tether assembly 250 restricts relative movement between the upper portion 212 and the extension portion 240 of the side airbag 200 so that the airbag takes on the illustrated curved configuration. Since the extension portion is anchored to the vehicle seat 54, the restricted movement is primarily or exclusively that of the upper portion 212 relative to the extension portion 240. In the example configuration of FIGS. 4-6, the side airbag 200 is curved, from the upper portion 212 to the extension portion 240/mid-portion 216, convexly toward the occupant. More specifically, the exterior surface of the second airbag panel 204 is curved convexly toward the occupant, and the exterior surface of the first airbag panel 202 is curved concavely toward the vehicle centerline CL. The degree or extent of the curvature illustrated in the figures is by way of example only. The curvature can be tailored according to requirements dictated by, for example, available space and vehicle architecture.

The curved shape of the inflated side airbag 200 is due to the fact that a distance D1 (see FIG. 6) representing the length of the tether assembly 250 measured between terminal ends of the tether assembly is less than a distance D2 representing a length of the side airbag 200 measured between the upper portion 212 and extension portion 240. As a result of this length differential, the tether assembly 250 restricts the side airbag 200 from deploying to the fully expanded state to which it would otherwise expand if unrestricted. In the example configuration shown in FIGS. 4-6, the side airbag 250 would, if not restricted by the tether assembly 250, expand to a generally linear shape instead of the illustrated curved shape, as indicated generally by dashed lines at 200' in FIG. 4.

The direction of curvature of the side airbag 200 is due to the tether assembly 250 being secured to the outer surface of the first airbag panel 202. This connection, in combination with the configurations and dimensions of the tether assembly 250, helps ensure that the resulting restriction of the upper and extension portions 212, 240 and of curvature of the side airbag 200 in the desired manner. In the example configuration of FIGS. 4-6, this curvature is convexly toward the occupant, given the inboard mounting location of the side airbag 200.

Implementing the first and second anchor panels 252, 254 of the tether assembly 250 provides several benefits. The anchor panels 252, 254 are shaped to coincide with the shapes of the upper and extension portions 212, 240, respectively, of the side airbag 200. The connections 224, which connect the peripheral portions 260, 262 of the anchor panels 252, 254, extends the connection of the anchor panels to the airbag across the width of the upper portion 212 and extension portion 240. Leaving the edges 264, 266 of the anchor panels 252, 254 disconnected from the side airbag 200 therefore causes the tension forces applied to the airbag by the tether assembly 250 to be applied along the peripheries 260, 262.

The application of the tension forces along the peripheries 260, 262 helps distribute forces generated by the tensioning of the tether assembly 250 during inflation of the side airbag 200 over a larger area of the airbag than would be the case if the strap 256 alone were used. Distributing these forces helps reduce the stress between any particular point of connection with the airbag and also helps prevent the occurrence of stress risers where material failures can occur. The connection of the tether assembly 250 to the side airbag 200 is therefore robust.

Distributing the restriction forces that the tether assembly 250 exerts on the side airbag 200 along the peripheries 260, 262 also helps ensure that the entire side airbag assumes the desired curved configuration or shape. If the strap 256 were to have a narrow connection (i.e., the width of the strap) with the upper and extension portions 212, 240 of the side airbag 200, instead of assuming a generally uniform curved configuration as shown in FIG. 4, the airbag could instead become bunched or caved-in in the areas of these narrow connections. This is because the tension applied by the strap 256 would be focused on the central areas of the upper and extension portions where the connection is made. The strap 256 would act on these focused areas as desired, but the areas adjacent the strap connection would be urged by inflation fluid pressure to move toward the unrestricted condition of the side airbag 200. Utilizing the anchor panels 252, 254 to make the connection distributes the tension forces applied by the strap 256 across the entire upper and extension portions 212, 240 of the side airbag 200, which helps prevent or eliminate any caving-in or bunching.

Advantageously, the curved configuration of the side airbag 200 enforced by the tether assembly 250 helps improve the occupant protection performance of the vehicle safety system 50. During deployment, as the side airbag 200 moves toward the inflated condition, the curvature in the airbag develops. Due to the location of the side airbag 200 and the direction of its curvature, the movement of the deploying airbag is not only upward and forward (with respect to the direction of forward vehicle travel) from the stowed condition in the vehicle seat 54, but also outboard toward the occupant 20. This airbag motion can act to increase the responsiveness of the safety system 50 by reducing the time it takes for the side airbag 200 to initially engage the occupant 20.

In the example configuration of FIG. 4, the airbag is mounted on the inboard side of the vehicle seat 54 and therefore offers occupant protection in the area of the vehicle centerline CL. Being intended primarily for helping to protect the occupant 20 in response to events such as a side impact, offset frontal impact, or oblique frontal/side impact, and being inboard or center mounted, the side airbag 200 can help protect the occupant in collisions that occur on the opposite side of the vehicle (i.e., the driver side in the example configuration of FIG. 4). In those instances, the outboard movement of the deploying airbag 200 can help decelerate or reverse the inboard movement of the occupant 20, which can help protect against occupant-on-occupant impacts. To this end, the side airbag 200 can also act as a barrier between occupants seated adjacent each other.

Additionally, the curved configuration of the side airbag 200 can help overcome the lack or reduced size of a reaction surface for the airbag. The curvature of the side airbag 200 in combination with the pressurization of the airbag, can offer resistance to inboard occupant movement. This can, for example, be due to the fact that the side airbag 200, when assuming the curved configuration, deploys/moves toward the occupant, who is being urged to move inboard due to the crash forces. The airbag movement counteracts the occupant movement, which helps improve the level of protection afforded to the occupant.

Figure 7:
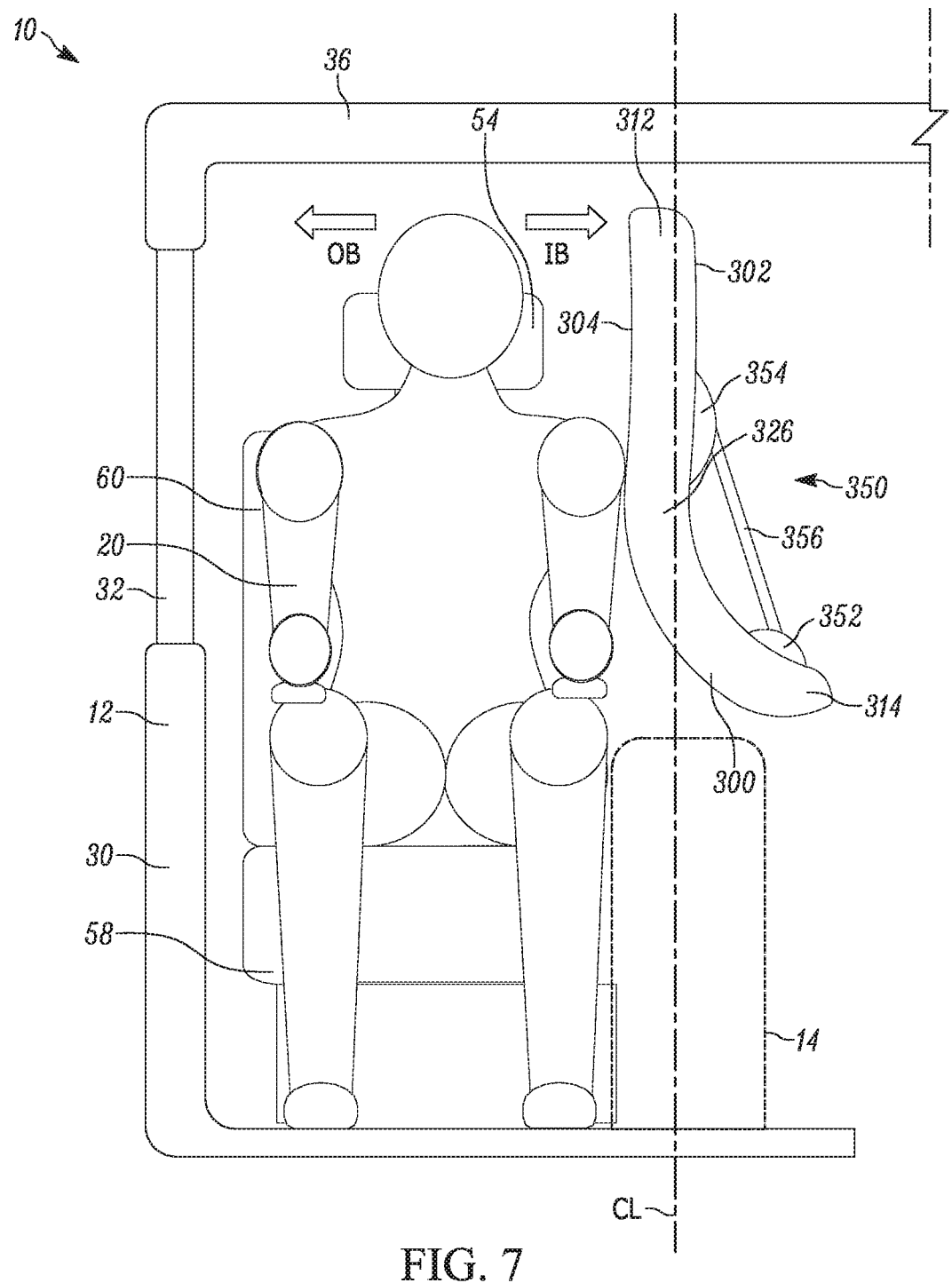
FIG. 7 is a front view of a vehicle safety system according to a third example configuration of the invention.
Figure 8:
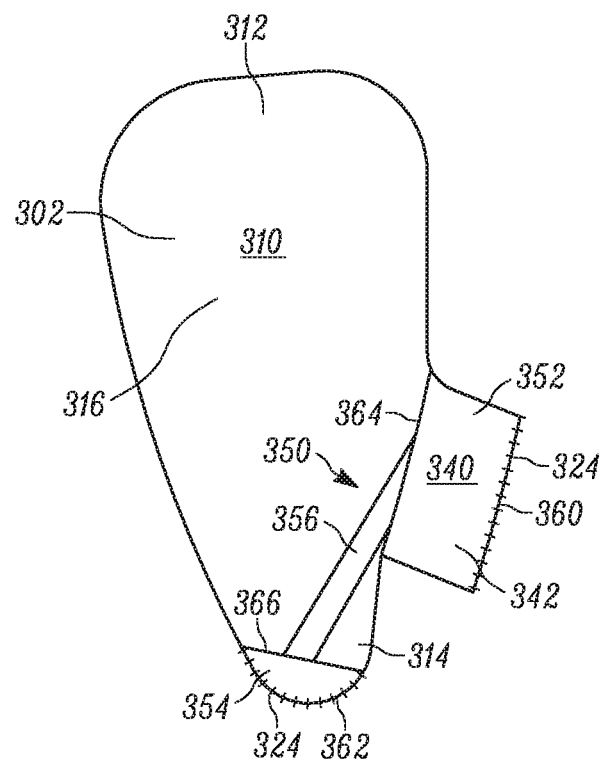
FIG. 8 is a side view of a portion of the vehicle safety system of FIG. 7.
Figure 9:
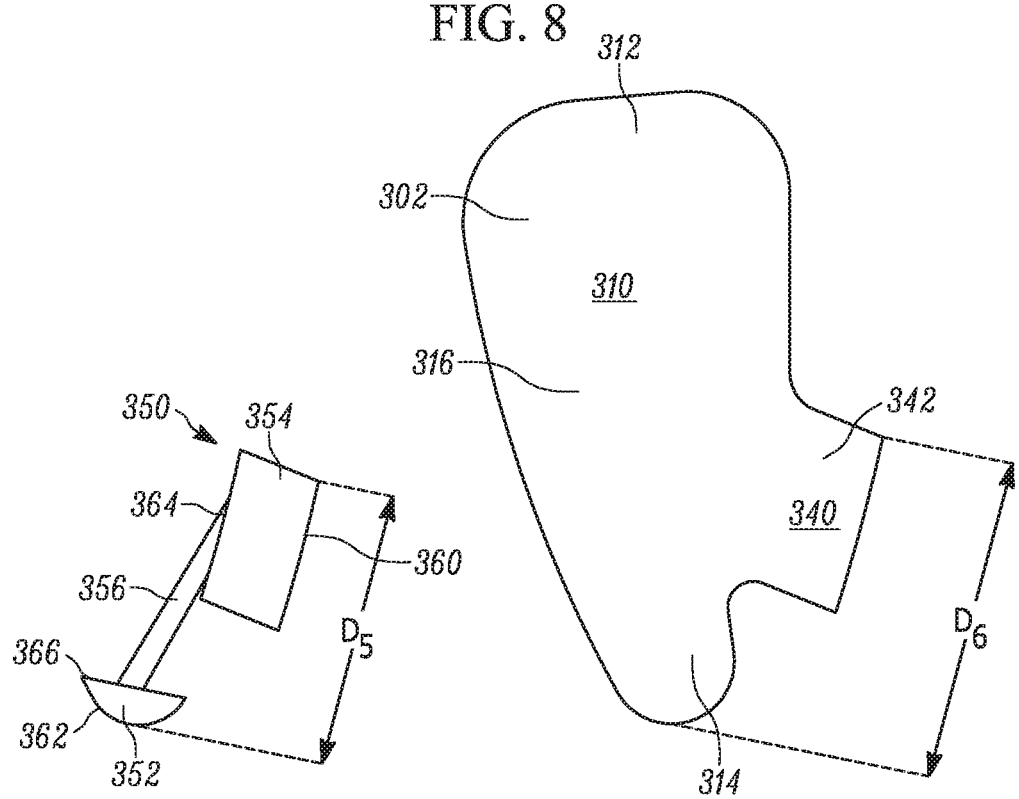
FIG. 9 is an exploded view of the portion of FIG. 8.

A third example configuration of the vehicle safety system 50 is illustrated in FIGS. 7-9. The vehicle safety system 50 of FIGS. 7-9 is similar or identical to the configurations of FIGS. 1-3 and 4-6, except that the configuration of the side airbag, specifically the tether assembly, is different.

As shown in FIG. 7, the vehicle safety system 50 is configured for inboard occupant protection, so the side airbag 300 is inflatable on the inboard side of the vehicle seat. The side airbag 300 includes a first airbag panel 302 and a second airbag panel 304 that help define an inflatable volume of the side airbag 300. When the side airbag 300 is inflated, the first airbag panel 302 is positioned facing away from the vehicle seat 54 and the occupant 20, of the second airbag panel 304 is positioned facing toward the vehicle seat 54 and the occupant 20. In this description, when the panels 302, 304 are described as "facing" in a certain direction, it is meant to refer to the direction which surfaces of the panels on the exterior of the side airbag 300 face.

The first and second airbag panels 302, 304 can be manufactured from any material suited to construct a side airbag, such as a woven nylon fabric. The first and second airbag panels 302, 304 can be separately manufactured and subsequently attached to one another to form the side airbag 300. Alternatively, the panels 302, 304 can be portions of a single folded panel. As another alternative, the side airbag 300 can be of a one-piece woven airbag construction.

The side airbag 300 of FIGS. 7-9 includes a main body portion 310 and an extension portion 340. The side airbag 300 includes an upper portion 312 for being positioned adjacent the normally seated occupant's head, shoulders/upper torso when inflated. The side airbag 300 also includes a lower portion 314 for being positioned adjacent the normally seated occupant's hips/lower torso when inflated. The side airbag 300 also includes a mid-portion 316, between the upper and lower portions 312, 314, for being positioned adjacent the normally seated occupant's torso when inflated. The extension portion 340 extends rearward from the mid-portion 316 toward the seat back 60. The extension portion 340 is configured to receive the inflator and also to facilitate connecting the side airbag 300 to the vehicle seat frame.

The side airbag 300 includes a tether assembly 350 for shaping the side airbag when deployed. In the example configuration of FIGS. 7-9, the tether assembly 350 is connected to the lower portion 314 and the extension portion 340 of the side airbag 300 to shape the airbag to curve toward the occupant 20, from the lower portion 314 to the extension portion 340. Since the extension portion 340 lies in the mid-portion 316 of the side airbag 300, the airbag curves toward the occupant 20 from the lower portion 314 to the mid-portion 316. This is shown in FIG. 7. As shown, the side airbag 300 curve is convexly outboard toward the occupant 20 and the side structure 12, away from the vehicle centerline CL. In this curved condition of the side airbag 300, the second airbag panel 304 faces convexly toward the occupant 20 and the side structure 12.

The tether assembly 350 includes a first, upper anchor panel 352, a second, lower anchor panel 354, and a strap 356 that interconnects the upper and lower anchor panels. The strap 356 has a width that can be substantially smaller (e.g., as little as 20% or less) than the widths of the upper and lower anchor panels 352, 354. The tether assembly 350 can be constructed of any suitable material, such as airbag fabric. The tether assembly 350 can be a single piece of material that is cut to the shape of its three components, or it can be three separate pieces of material that are interconnected by known means, such as stitching or ultrasonic welding. The tether assembly 350 is positioned on an exterior surface of the airbag, i.e., on an exterior surface of the first airbag panel 302. The tether assembly 350 faces away from the vehicle seat and the seated occupant 20 (inboard in FIG. 7) when the side airbag 300 is inflated.

The upper anchor panel 352 is attached to the extension portion 342 of the first airbag panel 302. As shown in FIGS. 8 and 9, the upper anchor panel 352 can be configured and shaped to correspond to the extension portion 342 of the first airbag panel 302. The lower anchor panel 354 is attached to the lower portion 314 of the first airbag panel 302. As shown in FIGS. 8 and 9, the lower anchor panel 354 can be configured and shaped to correspond to the lower portion 314 of the first airbag panel 302. The upper and lower anchor panels 352, 354 can be secured to the first airbag panel 302 by connections 324, such as stitching or ultrasonic welding. As shown in FIG. 8, the connections 324 extends about and interconnects respective peripheries 360, 362 of the upper and lower anchor panels 352, 354 that coincide with and overlie peripheries of the extension portion 340 and lower portion 314 of the side airbag 300, respectively. Edge portions 364, 366 of the upper and lower anchor panels 352, 354, respectively, are left free from connection to the side airbag 300. The strap 356 is connected to these edge portions 364, 366, by stitching, ultrasonic welding, or as a result of the tether assembly 350 being constructed of a single piece of material.

When the controller actuates the inflator, inflation fluid flows through the extension portion 340, which acts a mouth or conduit for directing inflation fluid into the main body portion 310 to inflate the side airbag 300. The side airbag 300 inflates out of the vehicle seat 54 to the inflated condition shown in FIG. 7.

As shown in FIG. 7, the tether assembly 350 restricts relative movement between the lower portion 314 and the extension portion 340 of the side airbag 300 so that the airbag takes on the illustrated curved configuration. Since the extension portion is anchored to the vehicle seat 54, the restricted movement is primarily or exclusively that of the lower portion 314 relative to the extension portion 340. In the example configuration of FIGS. 7-9, the side airbag 300 is curved, from the lower portion 314 to the extension portion 340/mid-portion 316, convexly toward the occupant. More specifically, the exterior surface of the second airbag panel 304 is curved convexly toward the occupant, and the exterior surface of the first airbag panel 302 is curved concavely toward the vehicle centerline CL. The degree or extent of the curvature illustrated in the figures is by way of example only. The curvature can be tailored according to requirements dictated by, for example, available space and vehicle architecture.

The curved shape of the inflated side airbag 300 is due to the fact that a distance D1 (see FIG. 9) representing the length of the tether assembly 350 measured between terminal ends of the tether assembly is less than a distance D2 representing a length of the side airbag 300 measured between the lower portion 314 and extension portion 340. As a result of this length differential, the tether assembly 350 restricts the side airbag 300 from deploying to the fully expanded state to which it would otherwise expand if unrestricted. In the example configuration shown in FIGS. 7-9, the side airbag 350 would, if not restricted by the tether assembly 350, expand to a generally linear shape instead of the illustrated curved shape, as indicated generally by dashed lines at 300' in FIG. 7.

The direction of curvature of the side airbag 300 is due to the tether assembly 350 being secured to the outer surface of the first airbag panel 302. This connection, in combination with the configurations and dimensions of the tether assembly 350, helps ensure that the resulting restriction of the lower and extension portions 314, 340 and of curvature of the side airbag 300 in the desired manner. In the example configuration of FIGS. 7-9, this curvature is convexly toward the occupant, given the inboard mounting location of the side airbag 300.

Implementing the first and second anchor panels 352, 354 of the tether assembly 350 provides several benefits. The anchor panels 352, 354 are shaped to coincide with the shapes of the lower and extension portions 314, 340, respectively, of the side airbag 300. The connections 324, which connect the peripheral portions 360, 362 of the anchor panels 352, 354, extends the connection of the anchor panels to the airbag across the widths of the lower portion 314 and extension portion 340. Leaving the edges 364, 366 of the anchor panels 352, 354 disconnected from the side airbag 300 therefore causes the tension forces applied to the airbag by the tether assembly 350 to be applied along the peripheries 360, 362.

The application of the tension forces along the peripheries 360, 362 helps distribute forces generated by the tensioning of the tether assembly 350 during inflation of the side airbag 300 over a larger area of the airbag than would be the case if the strap 356 alone were used. Distributing these forces helps reduce the stress between any particular point of connection with the airbag and also helps prevent the occurrence of stress risers where material failures can occur. The connection of the tether assembly 350 to the side airbag 300 is therefore robust.

Distributing the restriction forces that the tether assembly 350 exerts on the side airbag 300 along the peripheries 360, 362 also helps ensure that the entire side airbag assumes the desired curved configuration or shape. If the strap 356 were to have a narrow connection (i.e., the width of the strap) with the lower and extension portions 314, 340 of the side airbag 300, instead of assuming a generally uniform curved configuration as shown in FIG. 7, the airbag could instead become bunched or caved-in in the areas of these narrow connections. This is because the tension applied by the strap 356 would be focused on the central areas of the lower and extension portions where the connection is made. The strap 356 would act on these focused areas as desired, but the areas adjacent the strap connection would be urged by inflation fluid pressure to move toward the unrestricted condition of the side airbag 300. Utilizing the anchor panels 352, 354 to make the connection distributes the tension forces applied by the strap 356 across the entire lower and extension portions 314, 340 of the side airbag 300, which helps prevent or eliminate any caving-in or bunching.

Advantageously, the curved configuration of the side airbag 300 enforced by the tether assembly 350 helps improve the occupant protection performance of the vehicle safety system 50. During deployment, as the side airbag 300 moves toward the inflated condition, the curvature in the airbag develops. Due to the location of the side airbag 300 and the direction of its curvature, the movement of the deploying airbag is not only upward and forward (with respect to the direction of forward vehicle travel) from the stowed condition in the vehicle seat 54, but also outboard toward the occupant 20. This airbag motion can act to increase the responsiveness of the safety system 50 by reducing the time it takes for the side airbag 300 to initially engage the occupant 20.

In the example configuration of FIG. 7, the airbag is mounted on the inboard side of the vehicle seat 54 and therefore offers occupant protection in the area of the vehicle centerline CL. Being intended primarily for helping to protect the occupant 20 in response to events such as a side impact, offset frontal impact, or oblique frontal/side impact, and being inboard or center mounted, the side airbag 300 can help protect the occupant in collisions that occur on the opposite side of the vehicle (i.e., the driver side in the example configuration of FIG. 4). In those instances, the outboard movement of the deploying airbag 300 can help decelerate or reverse the inboard movement of the occupant 20, which can help protect against occupant-on-occupant impacts. To this end, the side airbag 300 can also act as a barrier between occupants seated adjacent each other.

Additionally, the curved configuration of the side airbag 300 can help overcome the lack or reduced size of a reaction surface for the airbag. The curvature of the side airbag 300 in combination with the pressurization of the airbag, can offer resistance to inboard occupant movement. This can, for example, be due to the fact that the side airbag 300, when assuming the curved configuration, deploys/moves toward the occupant, who is being urged to move inboard due to the crash forces. The airbag movement counteracts the occupant movement, which helps improve the level of protection afforded to the occupant.

Figure 10:
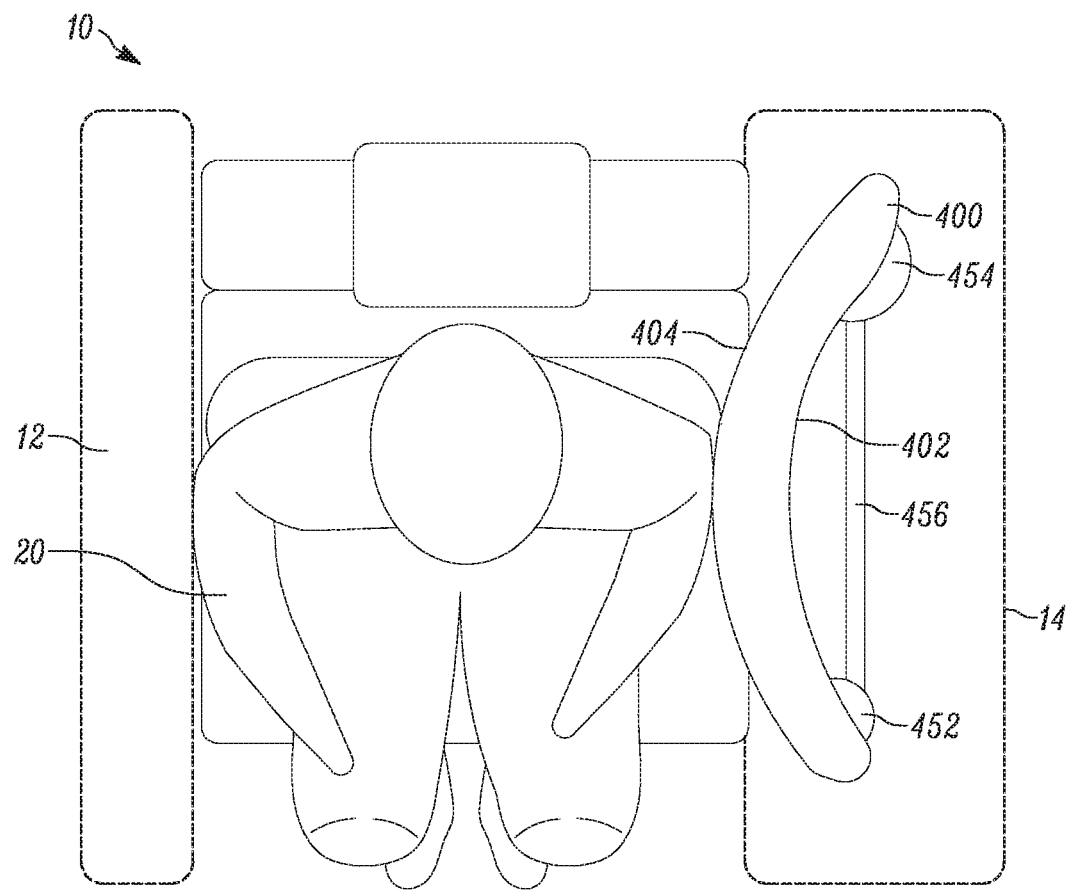
FIG. 10 is a top view of a vehicle safety system according to a fourth example configuration of the invention.
Figure 11:
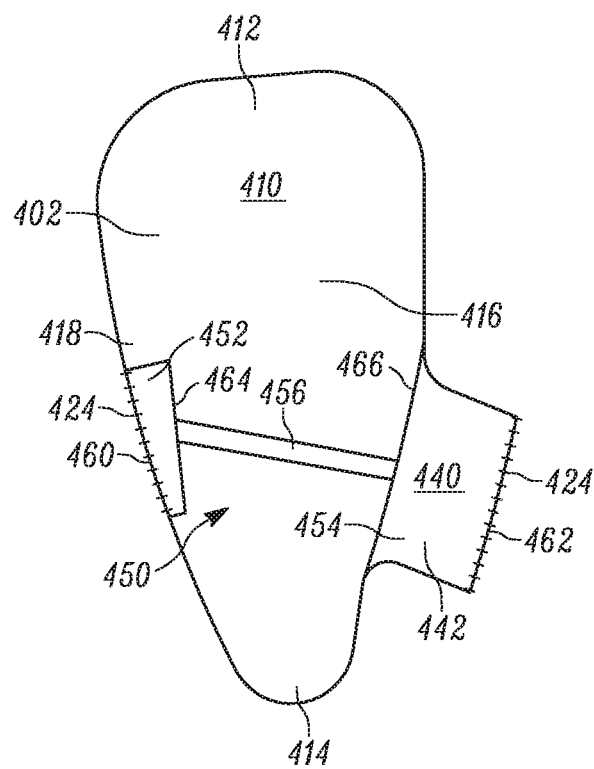
FIG. 11 is a side view of a portion of the vehicle safety system of FIG. 10.
Figure 12:
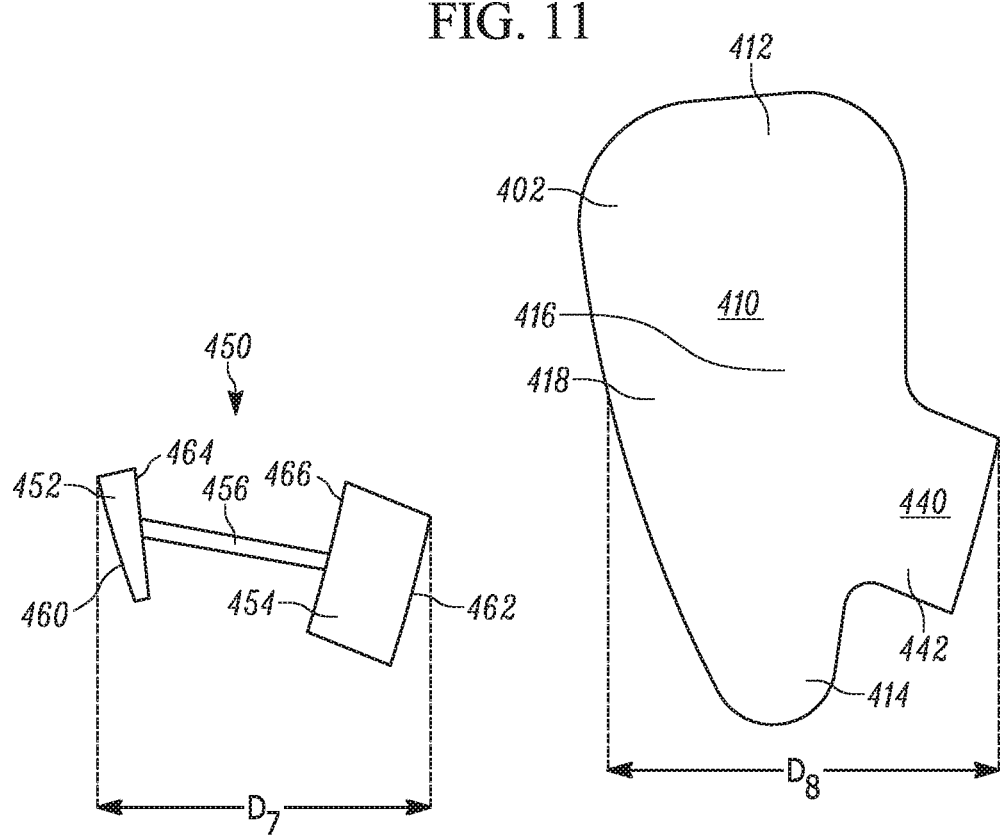
FIG. 12 is an exploded view of the portion of FIG. 11.

A fourth example configuration of the vehicle safety system 50 is illustrated in FIGS. 10-12. The vehicle safety system 50 of FIGS. 10-12 is similar or identical to the configurations of FIGS. 1-3, 4-6, and 7-9, except that the configuration of the side airbag, specifically the tether assembly, is different.

As shown in FIG. 10, the vehicle safety system 50 is configured for inboard occupant protection, so the side airbag 400 is inflatable on the inboard side of the vehicle seat. The side airbag 400 includes a first airbag panel 402 and a second airbag panel 404 that help define an inflatable volume of the side airbag 400. When the side airbag 400 is inflated, the first airbag panel 402 is positioned facing away from the vehicle seat 54 and the occupant 20, of the second airbag panel 404 is positioned facing toward the vehicle seat 54 and the occupant 20. In this description, when the panels 402, 404 are described as "facing" in a certain direction, it is meant to refer to the direction which surfaces of the panels on the exterior of the side airbag 400 face.

The first and second airbag panels 402, 404 can be manufactured from any material suited to construct a side airbag, such as a woven nylon fabric. The first and second airbag panels 402, 404 can be separately manufactured and subsequently attached to one another to form the side airbag 400. Alternatively, the panels 402, 404 can be portions of a single folded panel. As another alternative, the side airbag 400 can be of a one-piece woven airbag construction.

The side airbag 400 of FIGS. 10-12 includes a main body portion 410 and an extension portion 440. The side airbag 400 includes an upper portion 412 for being positioned adjacent the normally seated occupant's head, shoulders/upper torso when inflated. The side airbag 400 also includes a lower portion 414 for being positioned adjacent the normally seated occupant's hips/lower torso when inflated. The side airbag 400 also includes a mid-portion 416, between the upper and lower portions 412, 414, for being positioned adjacent the normally seated occupant's torso when inflated. The extension portion 440 extends rearward from the mid-portion 416 toward the seat back 60. The extension portion 440 is configured to receive the inflator and also to facilitate connecting the side airbag 400 to the vehicle seat frame.

The side airbag 400 includes a tether assembly 450 for shaping the side airbag when deployed. In the example configuration of FIGS. 10-12, the tether assembly 450 is connected to the forward portion 418 and the extension portion 440 of the side airbag 400 to shape the airbag to curve toward the occupant 20, from the forward portion 418 to the extension portion 440. Since the forward and extension portions 416, 440 lie in the mid-portion 416 of the side airbag 400, the tether assembly 450 curves the mid-portion toward the occupant 20 from front-to-rear, as shown in FIG. 10. As shown, the side airbag 400 curve is convexly outboard toward the occupant 20 and the side structure 12, away from the vehicle centerline CL. In this curved condition of the side airbag 400, the second airbag panel 404 faces convexly toward the occupant 20 and the side structure 12. Again, this curvature is front-to-back, as opposed to the top-to-bottom curvature in the previous example configurations.

The tether assembly 450 includes a first, front anchor panel 452, a second, rear anchor panel 454, and a strap 456 that interconnects the front and rear anchor panels. The strap 456 has a width that can be substantially smaller (e.g., as little as 20% or less) than the widths of the front and rear anchor panels 452, 454. The tether assembly 450 can be constructed of any suitable material, such as airbag fabric. The tether assembly 450 can be a single piece of material that is cut to the shape of its three components, or it can be three separate pieces of material that are interconnected by known means, such as stitching or ultrasonic welding. The tether assembly 450 is positioned on an exterior surface of the airbag, i.e., on an exterior surface of the first airbag panel 402. The tether assembly 450 faces away from the vehicle seat and the seated occupant 20 (inboard in FIG. 10) when the side airbag 400 is inflated.

The front anchor panel 452 is attached to a front portion 444 of the first airbag panel 402 at the location where the first airbag panel helps define the forward portion 418 of the airbag 400. As shown in FIGS. 11 and 12, the front anchor panel 452 can be configured and shaped to correspond to the configuration and shape of the first airbag panel 402 at that location. The rear anchor panel 454 is attached to the extension portion 442 of the first airbag panel 402. As shown in FIGS. 11 and 12, the rear anchor panel 454 can be configured and shaped to correspond to the extension portion 442 of the first airbag panel 402. The front and rear anchor panels 452, 454 can be secured to the first airbag panel 402 by connections 424, such as stitching or ultrasonic welding. As shown in FIG. 8, the connections 424 extends about and interconnects respective peripheries 460, 462 of the front and rear anchor panels 452, 454 that coincide with and overlie peripheries of the extension portion 440 and lower portion 414 of the side airbag 400, respectively. Edge portions 464, 466 of the front and rear anchor panels 452, 454, respectively, are left free from connection to the side airbag 400. The strap 456 is connected to these edge portions 464, 466, by stitching, ultrasonic welding, or as a result of the tether assembly 450 being constructed of a single piece of material.

When the controller actuates the inflator, inflation fluid flows through the extension portion 440, which acts a mouth or conduit for directing inflation fluid into the main body portion 410 to inflate the side airbag 400. The side airbag 400 inflates out of the vehicle seat 54 to the inflated condition shown in FIG. 10.

As shown in FIG. 10, the tether assembly 450 restricts relative movement between the lower portion 414 and the extension portion 440 of the side airbag 400 so that the airbag takes on the illustrated curved configuration. Since the extension portion is anchored to the vehicle seat 54, the restricted movement is primarily or exclusively that of the lower portion 414 relative to the extension portion 440. In the example configuration of FIGS. 10-12, the side airbag 400 is curved, from the lower portion 414 to the extension portion 440/mid-portion 416, convexly toward the occupant. More specifically, the exterior surface of the second airbag panel 404 is curved convexly toward the occupant, and the exterior surface of the first airbag panel 402 is curved concavely toward the vehicle centerline CL. The degree or extent of the curvature illustrated in the figures is by way of example only. The curvature can be tailored according to requirements dictated by, for example, available space and vehicle architecture.

The curved shape of the inflated side airbag 400 is due to the fact that a distance D1 (see FIG. 9) representing the length of the tether assembly 450 measured between terminal ends of the tether assembly is less than a distance D2 representing a length of the side airbag 400 measured between the forward portion 418 and extension portion 440. As a result of this length differential, the tether assembly 450 restricts the side airbag 400 from deploying to the fully expanded state to which it would otherwise expand if unrestricted. In the example configuration shown in FIGS. 10-12, the side airbag 450 would, if not restricted by the tether assembly 450, expand to a generally linear shape instead of the illustrated curved shape, as indicated generally by dashed lines at 400' in FIG. 10.

The direction of curvature of the side airbag 400 is due to the tether assembly 450 being secured to the outer surface of the first airbag panel 402. This connection, in combination with the configurations and dimensions of the tether assembly 450, helps ensure that the resulting restriction of the forward and extension portions 416, 440 and of curvature of the side airbag 400 in the desired manner. In the example configuration of FIGS. 10-12, this curvature is convexly toward the occupant, given the inboard mounting location of the side airbag 400.

Implementing the first and second anchor panels 452, 454 of the tether assembly 450 provides several benefits. The anchor panels 452, 454 are shaped to coincide with the shapes of the forward and extension portions 416, 440, respectively, of the side airbag 400. The connections 424, which connect the peripheral portions 460, 462 of the anchor panels 452, 454, extends the connections of the anchor panels to the airbag along their respective lengths. Leaving the edges 464, 466 of the anchor panels 452, 454 disconnected from the side airbag 400 therefore causes the tension forces applied to the airbag by the tether assembly 450 to be applied along the peripheries 460, 462.

The application of the tension forces along the peripheries 460, 462 helps distribute forces generated by the tensioning of the tether assembly 450 during inflation of the side airbag 400 over a larger area of the airbag than would be the case if the strap 456 alone were used. Distributing these forces helps reduce the stress between any particular point of connection with the airbag and also helps prevent the occurrence of stress risers where material failures can occur. The connection of the tether assembly 450 to the side airbag 400 is therefore robust.

Distributing the restriction forces that the tether assembly 450 exerts on the side airbag 400 along the peripheries 460, 462 also helps ensure that the entire side airbag assumes the desired curved configuration or shape. If the strap 456 were to have a narrow connection (i.e., the width of the strap) with the forward and extension portions 416, 440 of the side airbag 400, instead of assuming a generally uniform curved configuration as shown in FIG. 10, the airbag could instead become bunched or caved-in in the areas of these narrow connections. This is because the tension applied by the strap 456 would be focused on the central areas of the forward and extension portions where the connection is made. The strap 456 would act on these focused areas as desired, but the areas adjacent the strap connection would be urged by inflation fluid pressure to move toward the unrestricted condition of the side airbag 400. Utilizing the anchor panels 452, 454 to make the connection distributes the tension forces applied by the strap 456 across the entire forward and extension portions 416, 440 of the side airbag 400, which helps prevent or eliminate any caving-in or bunching.

Advantageously, the curved configuration of the side airbag 400 enforced by the tether assembly 450 helps improve the occupant protection performance of the vehicle safety system 50. During deployment, as the side airbag 400 moves toward the inflated condition, the curvature in the airbag develops. Due to the location of the side airbag 400 and the direction of its curvature, the movement of the deploying airbag is not only upward and forward (with respect to the direction of forward vehicle travel) from the stowed condition in the vehicle seat 54, but also outboard toward the occupant 20. This airbag motion can act to increase the responsiveness of the safety system 50 by reducing the time it takes for the side airbag 400 to initially engage the occupant 20.

In the example configuration of FIG. 10, the airbag is mounted on the inboard side of the vehicle seat 54 and therefore offers occupant protection in the area of the vehicle centerline CL. Being intended primarily for helping to protect the occupant 20 in response to events such as a side impact, offset frontal impact, or oblique frontal/side impact, and being inboard or center mounted, the side airbag 400 can help protect the occupant in collisions that occur on the opposite side of the vehicle (i.e., the driver side in the example configuration of FIG. 4). In those instances, the outboard movement of the deploying airbag 400 can help decelerate or reverse the inboard movement of the occupant 20, which can help protect against occupant-on-occupant impacts. To this end, the side airbag 400 can also act as a barrier between occupants seated adjacent each other.

Additionally, the curved configuration of the side airbag 400 can help overcome the lack or reduced size of a reaction surface for the airbag. The curvature of the side airbag 400 in combination with the pressurization of the airbag, can offer resistance to inboard occupant movement. This can, for example, be due to the fact that the side airbag 400, when assuming the curved configuration, deploys/moves toward the occupant, who is being urged to move inboard due to the crash forces. The airbag movement counteracts the occupant movement, which helps improve the level of protection afforded to the occupant.

What have been described above are examples configurations of the invention. It is, of course, not possible to describe every conceivable combination of components or method for purposes of describing the disclosure, but one of ordinary skill in the art will recognize that many further combinations and permutations of the disclosure are possible. For example, the vehicle safety system can be configured to provide outboard occupant protection, i.e., deploy the airbag between the vehicle seat and side structure, instead of inboard at or near the vehicle centerline. Additionally, the example configurations of the tether assembly disclosed herein are tailored to the example configurations of the side airbag. The configurations of the side airbags could, however, differ and, as such so can the tether assemblies. Furthermore, the vehicle safety system can be configured for being installed in alternative vehicle structures, such as the side structure, a vehicle door, or a center console. Accordingly, the disclosure is intended to embrace all such alterations, modifications, and variations that fall within the scope of this application, including the appended claims.

The invention claimed is:

1. A side airbag inflatable between an occupant of a vehicle seat and structure of a vehicle adjacent the vehicle seat, the airbag comprising:
    a first airbag panel for being positioned facing away from the vehicle seat, and a second airbag panel for being positioned facing the vehicle seat, the first and second panels defining an inflatable volume of the side airbag; and
    a tether assembly including a first anchor panel attached to a first portion of the first airbag panel, a second anchor panel attached to a second portion of the first airbag panel, and a strap having ends secured to and interconnecting the first anchor panel and the second anchor panel, wherein the tether assembly is dimensioned and configured to limit movement of the first and second portions away from each other in response to inflation of the side airbag so that the side airbag assumes a curved shape when inflated.

2. The side airbag of claim 1, wherein the tether assembly is configured so that the second airbag panel faces convexly toward the vehicle seat when the side airbag is inflated.

3. The side airbag of claim 1, wherein the side airbag is configured to be deployed on an inboard side of the vehicle seat, and wherein the second airbag panel faces convexly outboard of the vehicle toward the vehicle seat when the side airbag is inflated.

4. The side airbag of claim 1, wherein:
    the first anchor panel has a peripheral portion configured to match a peripheral portion of the first portion of the first airbag panel, the first anchor panel being positioned on the first portion of the first airbag panel so that their peripheral portions overlie each other, the first anchor panel being interconnected with the first portion of the first airbag panel along their overlying peripheral portions;
    the second anchor panel has a peripheral portion configured to match a peripheral portion of the second portion of the first airbag panel, the second anchor panel being positioned on the second portion of the first airbag panel so that their peripheral portions overlie each other, the second anchor panel being interconnected with the second portion of the first airbag panel along their overlying peripheral portions; and
    the strap is connected to respective edge portions of the first and second anchor panels, the edge portions of the first and second anchor panels being spaced from the peripheral portions of the first and second anchor panels and free from direct interconnections to the airbag.

5. The side airbag of claim 4, wherein the peripheral portion of the first anchor panel spans substantially the entire width of the first portion of the first airbag panel so that tension applied to the first anchor panel by the strap is distributed substantially across the entire width of the first portion of the first airbag panel.

6. The side airbag of claim 4, wherein the strap has a width that is substantially smaller than the widths of the first and second anchor panels.

7. The side airbag of claim 1, wherein the first portion of the first airbag panel is positioned at an upper extent of the side airbag and the second portion of the first airbag panel is positioned at a lower extent of the side airbag.

8. The side airbag of claim 7, wherein the airbag is curved along the height of the side airbag from the first portion to the second portion.

9. The side airbag of claim 1, wherein the first portion of the first airbag panel is positioned at an upper extent of the side airbag and the second portion of the first airbag panel is positioned on or adjacent a rear extension portion of the side airbag positioned between the upper and lower extents of the side airbag, wherein the extension portion is configured to connect the side airbag to the vehicle seat and to direct inflation fluid into the side airbag, and wherein the side airbag is curved from the first portion to the extension portion.

10. The side airbag of claim 9, wherein the airbag is curved along a diagonal extending from the first portion downward and rearward to the extension portion.

11. The side airbag of claim 1, wherein the first portion of the first airbag panel is positioned at a lower extent of the side airbag and the second portion of the first airbag panel is positioned on or adjacent a rear extension portion of the side airbag positioned between an upper extent and the lower extent of the side airbag, wherein the extension portion is configured to connect the side airbag to the vehicle seat and to direct inflation fluid into the side airbag, and wherein the side airbag is curved from the first portion to the extension portion.

12. The side airbag of claim 11, wherein the airbag is curved along a diagonal extending from the first portion upward and rearward to the extension portion.

13. The side airbag of claim 1, wherein the first portion of the first airbag panel is positioned at a forward extent of the side airbag and the second portion of the first airbag panel is positioned on or adjacent on or adjacent a rear extension portion of the side airbag positioned between upper and lower extents of the side airbag, wherein the extension portion is configured to connect the side airbag to the vehicle seat and to direct inflation fluid into the side airbag, and wherein the side airbag is curved from the first portion to the extension portion.

14. The side airbag of claim 13, wherein the airbag is curved along a horizontal extending from the first portion rearward to the extension portion.

15. The side airbag of claim 1, wherein the first and second airbag panels are overlaid to define a main body of the airbag, the main body portion having an upper portion, a lower portion, and an extension portion positioned between the upper and lower portions and extending rearward from the main body, wherein the extension portion is configured to receive inflation fluid from an inflator for inflating the side airbag and/or to attach the side airbag to the vehicle seat.

16. The side airbag of claim 15, wherein the extension portion is configured to attach the side airbag to a seat frame in a seatback of the vehicle seat.

17. An airbag module comprising the side airbag of claim 1, an inflator that is actuatable to inflate the side airbag, and a packaging for helping to support the side airbag in a deflated and stowed condition.

18. A vehicle safety system comprising the airbag module recited in claim 17 and a controller that is configured to actuate the inflator in response to a sensed crash event to cause the side airbag to inflate and deploy.

* * * * *